United States Patent
Franke et al.

(10) Patent No.: US 8,566,057 B2
(45) Date of Patent: Oct. 22, 2013

(54) METHOD FOR SELF-ADJUSTMENT OF A TRIAXIAL ACCELERATION SENSOR DURING OPERATION, AND SENSOR SYSTEM HAVING A THREE-DIMENSIONAL ACCELERATION SENSOR

(75) Inventors: Axel Franke, Ditzingen (DE); Alexander Buhmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 12/806,316

(22) Filed: Aug. 9, 2010

(65) Prior Publication Data
US 2011/0060543 A1   Mar. 10, 2011

(30) Foreign Application Priority Data

Sep. 4, 2009 (DE) .......................... 10 2009 029 216

(51) Int. Cl.
*G01P 21/00* (2006.01)
(52) U.S. Cl.
USPC ........... 702/104; 702/105; 702/141; 702/142; 702/145; 73/1.73; 73/1.38; 73/514.01; 73/514.02
(58) Field of Classification Search
USPC .............. 702/104, 105, 141, 142, 145; 703/2; 73/1.37, 1.38, 514.01, 514.02
See application file for complete search history.

(56) References Cited

U.S. PATENT DOCUMENTS

| 7,653,507 B2* | 1/2010 | Yamada et al. ............... 702/141 |
| 2006/0185429 A1* | 8/2006 | Liu et al. ...................... 73/146.5 |
| 2010/0121601 A1* | 5/2010 | Eckert ........................... 702/104 |
| 2010/0122565 A1* | 5/2010 | Miller et al. ................... 73/1.37 |

OTHER PUBLICATIONS

Ting et al., A Kalman Filter for Robust Outlier Detection, Proceedings of the 2007 IEEE/RSJ International Conference on Intelligent Robots and Systems, Oct. 29-Nov. 2, 2007, pp. 1514-1519.*
Grewal et al., Application of Kalman Filtering to the Calibration and Alignment of Inertial Navigation Systems, Proceedings of the 29th Conference on Decision and Control, Dec. 1990, pp. 3325-3334.*
Löetters et al.: "Procedure for in-use calibration of triaxial accelerometers in medical applications," *Sensors and Actuators* A 68 (1998), 221-228.

* cited by examiner

*Primary Examiner* — Sujoy Kundu
(74) *Attorney, Agent, or Firm* — Kenyon & Kenyon LLP

(57) ABSTRACT

A method for self-adjustment of a triaxial acceleration sensor during operation includes: calibrating the sensor; checking the self-adjustment for an interfering acceleration, with the aid of a measurement equation and estimated values for sensitivity and offset; repeating the adjustment if an interfering acceleration is recognized; and accepting the estimated values for sensitivity and offset as calibration values if an interfering acceleration is not recognized. The step of checking the self-adjustment includes: estimating sensitivity and/or offset and the variance thereof; determining an innovation as the difference between a measured value of the measurement equation and an estimated value of the measurement equation; testing the innovation for a normal distribution; and recognizing the interfering acceleration in the event of a deviation from the normal distribution.

18 Claims, 3 Drawing Sheets

METHOD FOR SELF-ADJUSTMENT OF A TRIAXIAL ACCELERATION SENSOR DURING OPERATION, AND SENSOR SYSTEM HAVING A THREE-DIMENSIONAL ACCELERATION SENSOR

BACKGROUND OF THE INVENTION

1. Field of the Invention

The present invention is directed to a method for self-adjustment of a triaxial acceleration sensor and a sensor system having a three-dimensional acceleration sensor during operation.

2. Description of Related Art

Micromechanical acceleration sensors are known, and are widely used in particular as acceleration or rotational rate sensors. The sensors must be adjusted to their field of application, using the higher-order process control system. The adjustment is usually carried out with a certain level of effort at the end of the manufacturing process by accelerating the sensor in its sensitive spatial axis, for all sensor axes in succession. These types of sensors have the disadvantage that a drift from the zero point and sensitivity during operation are not taken into account. Another approach is the use of the gravitational vector as a reference for an adjustment during operation, described in Loetters et al.: "Procedure for in-use calibration of triaxial accelerometers in medical applications," *Sensors and Actuators* A 68 (1998), 221-228. A method therein is based on the fundamental principle that the sensor on a patient is not constantly accelerated, but instead has rest phases in which the acceleration of gravity may be used for the calibration. The method essentially uses the following method steps, not necessarily in the order stated:

ensuring the observability of the sensitivity and the offset;

calibrating the sensor with the aid of calibration values for sensitivity and offset;

checking the self-adjustment for an interfering acceleration, with the aid of a measurement equation and estimated values for sensitivity and offset;

repeating the adjustment if an interfering acceleration is recognized;

accepting the estimated values for sensitivity and offset as calibration values if an interfering acceleration is not recognized.

Ensuring the observability of the sensitivity and the offset of the sensor means the recognition of a time interval which may be a candidate for a rest phase, so that sensitivity and offset may be determined as calibration values from the measured data. According to Loetters et al., the use of various filters ensures the observability and recognition of an interfering acceleration. One disadvantage of this method is that the filters in particular must be adapted to the product scenario, for example with respect to cut-off frequencies. This requires additional modeling, and limits the sensor to the particular scenarios. Loetters et al. use a sensor system having a three-dimensional acceleration sensor, a computing unit, and a memory, the computing unit being designed to carry out a calibration of the acceleration sensor during operation.

BRIEF SUMMARY OF THE INVENTION

In contrast, the method according to the present invention and the sensor system according to the present invention have the advantage that an observer recognizes interfering accelerations with the aid of statistical tests which do not have to be adapted to the product scenario. Sensor errors are estimated and corrected using estimators, for example Kalman filters and error square minimization algorithms. This results in the additional advantages that adjustment is not necessary at the end of the sensor manufacturing process, and that influences on the sensor parameters, such as temperature fluctuations and aging of the sensor, are implicitly taken into account. The present invention allows stipulation of stricter specifications, which may be maintained under external influences. A further advantage of the present invention is the reduction of testing costs.

A method according to the present invention for self-adjustment of a triaxial acceleration sensor during operation, having the following method steps:

b. calibrating the sensor with the aid of calibration values for sensitivity and offset—sensitivity and offset are determined;

c. checking the self-adjustment for an interfering acceleration with the aid of a measurement equation and estimated values for sensitivity and offset—a check is made as to whether an interfering acceleration has occurred during a calibration measurement;

d. repeating the adjustment if an interfering acceleration is recognized—in the event of an interfering acceleration the measured values are not suitable for a calibration;

e. accepting the estimated values for sensitivity and offset as calibration values if an interfering acceleration is not recognized—if no interfering acceleration is present, the measured values are suitable for a calibration, and the estimated values for sensitivity and offset are used as calibration data;

has the advantage according to the present invention that method step c. has the following substeps:

c1. estimating sensitivity and/or offset and the variance thereof;

c2. determining an innovation as the difference between a measured value of the measurement equation and an estimated value of the measurement equation;

c3. testing the innovation for a normal distribution;

c4. recognizing the interfering acceleration in the event of a deviation from the normal distribution.

In the subdivision of the procedure into method steps, it is pointed out that the individual steps are tuned to one another, and that different interactions may occur, depending on the embodiment. Thus, an interfering acceleration is any acceleration which deviates from a static state, i.e., rest or constant velocity, and thus practically any acceleration which differs from gravitational acceleration. This is frequently the acceleration which the sensor is intended to measure in the particular application, and which in such a case is output in method step d. in a corresponding advantageous embodiment. However, such an acceleration is an interference for the calibration. On the one hand, a rest phase of the sensor is defined as the absence of an interfering acceleration, which in one embodiment described below is relevant for observability in step a., and on the other hand, an interfering acceleration is recognized or its absence is verified in step c., in particular step c4. Substeps of method step c. in combination characterize the method according to the present invention, but with regard to the overall method may be used under one or several other method steps, so that their combination according to the present invention is still carried out in cooperation.

In one advantageous embodiment of the present invention, an estimator is used for estimating sensitivity and/or offset and the variance thereof. A Kalman filter is preferably used for estimating sensitivity and/or offset and the variance thereof. In this case the extended Kalman filter (EKF), as an iterative filter, is recommended as advantageous for real-time applications, and the unscented Kalman filter (UKF) is recommended for use with highly nonlinear functions.

The measurement equation advantageously describes the absolute value of the acceleration as corresponding to 1 g. In method step c2. the absolute value of an acceleration vector is preferably estimated to be equal to 1 g, and a measured value of 1 g is assumed for the acceleration.

In another advantageous embodiment of the present invention, a normalized innovation is used in method step c2., and in method step c3. the normalized innovation is tested for a chi square distribution instead of the normal distribution.

Another advantageous embodiment of the method according to the present invention includes, before method step b., method step a., ensuring the observability of the sensitivity and offset of the sensor, having substep a1, recognizing a rest situation. Method step a. preferably also includes substep a2., recognizing whether new information is present. Using this method step, a situation may be recognized in which a sensor alternates between only two positions over a fairly long period of time. These two positions do not provide information, since their gravitational vectors point in directions which have already been taken into account. The calibration of the sensor may drift without a false positive being recognized. According to the present invention, recognizing the new measured values as information which is not new may result in discarding of the new measured values for the statistics in order to avoid a false positive. Here as well, a statistical test may advantageously be used to ensure the observability. An observer estimates the state of the measuring device on the basis of one measurement, and the sensitivity and offset are determined from the measured data.

New information may be recognized using two approaches. The first approach is based on an analysis of the measured data or the estimated acceleration in a Cartesian coordinate system. A null hypothesis is established that two states originate from the same distribution function having a normal distribution. The null hypothesis may be proved or disproved with the aid of a z test and a suitable test variable. The second approach is based on the transformation of the measured data into polar coordinates. This allows an intuitive consideration of the new measured value. This approach is disadvantageous if zero errors which are present cause the radius to become small in polar coordinates, since in that case any data which are not new might be recognized as new. However, this approach offers advantages in conjunction with a Kalman filter, which estimates the gravitational acceleration.

A sensor system according to the present invention, having a three-dimensional acceleration sensor, a computing unit, and a memory, the computing unit being designed to carry out a calibration of the acceleration sensor during operation, has the advantage that the computing unit is designed to carry out the calibration of the acceleration sensor with the aid of an estimator, and to test a distribution function. As the result of using statistical methods there is no need to use application-specific filters.

In one example embodiment of the present invention, values of a zero error and/or of a sensitivity of the acceleration sensor are stored in the memory of the sensor system. These values may be used as starting values for a calibration during operation. The values of the zero error and/or of the sensitivity are advantageously stored in the memory during manufacture of the sensor system.

In one advantageous embodiment of the present invention the sensor system has an ASIC. This makes a compact sensor system having a sensor and an integrated evaluation unit possible.

In one alternative advantageous embodiment of the present invention, the sensor system has an external computing unit.

In this case, a computing unit which is already present for other purposes may perform the calibration of the sensor during operation.

The calibration preferably occurs in real time.

DETAILED DESCRIPTION OF THE INVENTION

Figure 1:
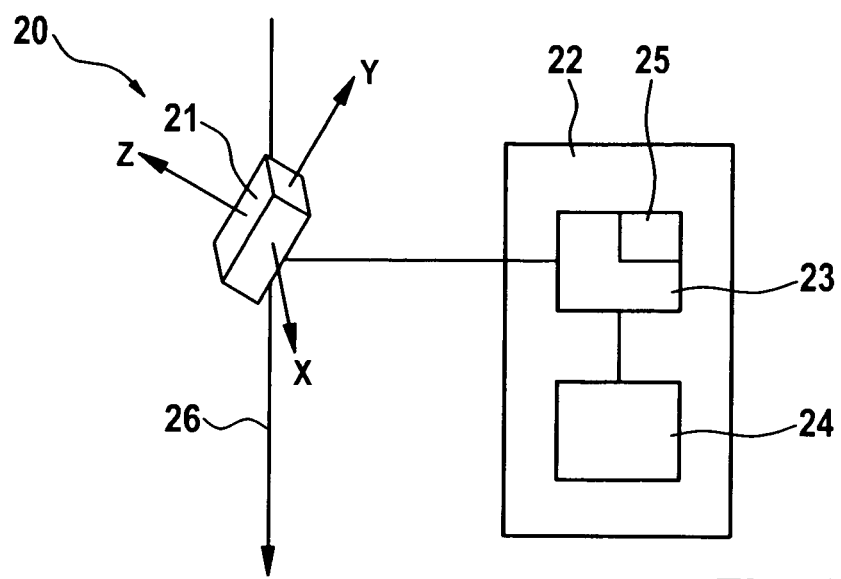
FIG. 1 shows a schematic representation of a sensor system according to the present invention, in a first example embodiment having an external computing unit.

FIG. 1 shows a sensor system 20 according to the present invention, having a three-dimensional acceleration sensor 21, and an external evaluation unit 22 having a computing unit 23 and a memory 24. Computing unit 23 has an estimator 25 which is advantageously implemented as software. Computing unit 23 is able to carry out a calibration of acceleration sensor 21 with the aid of estimator 25, and to carry out testing of a distribution function in real time. Acceleration sensor 21 is represented in three dimensions in its Cartesian coordinate system via axes x, y, z in the measuring directions of the sensor. In a rest state, gravity acts on the sensor in the direction of arrow 26, with the absolute value of 1 g of the gravitational acceleration.

Figure 2:
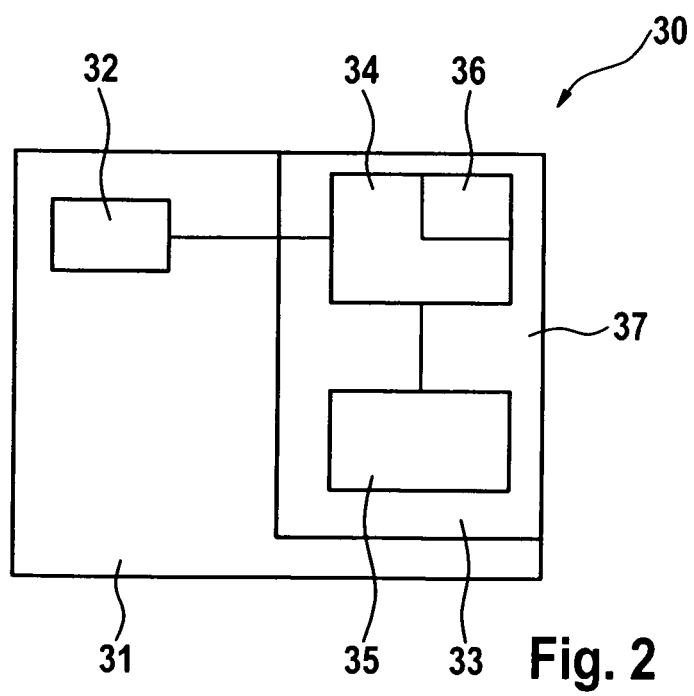
FIG. 2 shows a schematic representation of a sensor system according to the present invention, in a second example embodiment having an integrated computing unit.

FIG. 2 shows a sensor system 30 according to the present invention in one specific embodiment as an independent integrated module 31 having a three-dimensional acceleration sensor 32, and an evaluation unit 33, in the form of an ASIC 37, having a computing unit 34 and a memory 35. Computing unit 34 is designed to carry out a calibration of acceleration sensor 32 with the aid of an estimator 36, and to test a distribution function in real time. Values of a zero error and of a sensitivity of the acceleration sensor ascertained during manufacture of the sensor system are stored in memory 35.

Figure 3:
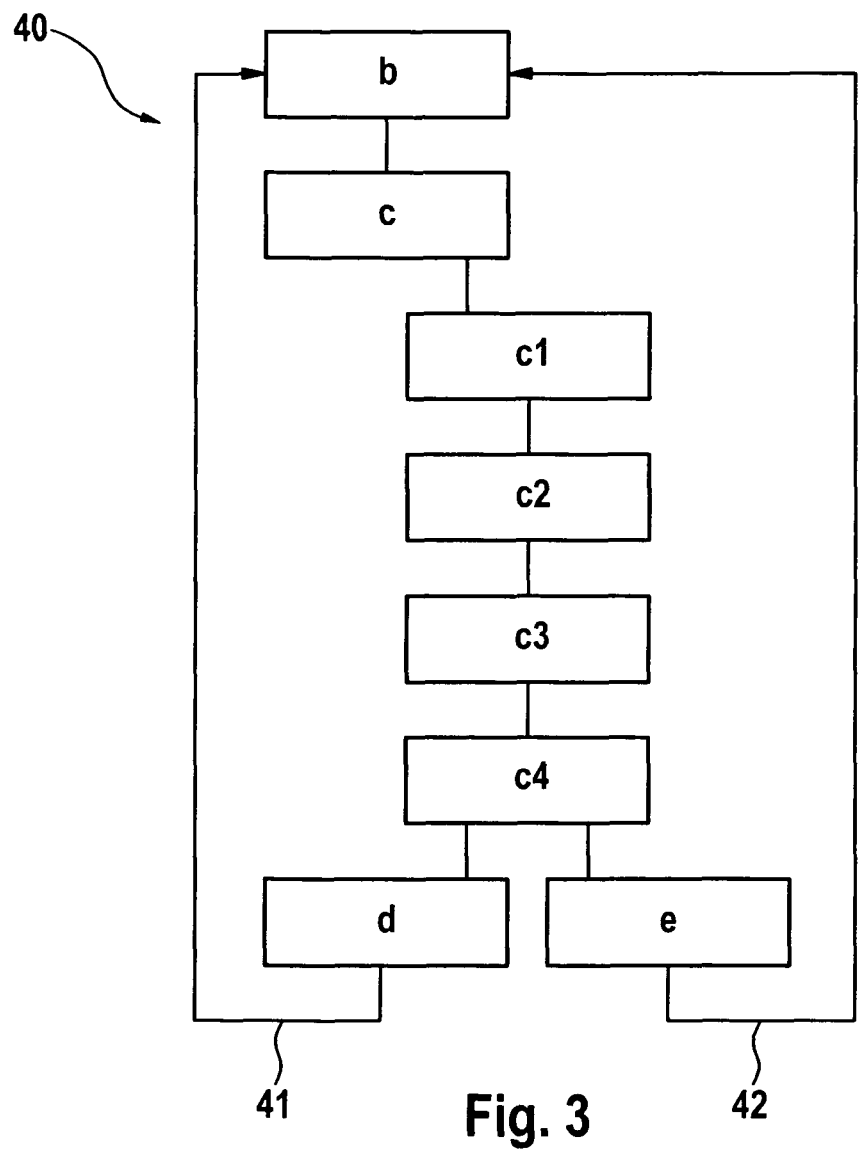
FIG. 3 shows a flow chart of the method according to the present invention in a first. example embodiment.

FIG. 3 shows in flow chart 40 a method for self-adjustment of a triaxial acceleration sensor during operation, having the following method steps:

b. calibrating the sensor with the aid of calibration values for sensitivity and offset;

c. checking the self-adjustment for an interfering acceleration with the aid of a measurement equation and estimated values for sensitivity and offset, having the following substeps:

c1. estimating sensitivity and/or offset and the variance thereof—a Kalman filter is employed, and is used as an estimator for estimating sensitivity and offset and the variance thereof;

c2. determining an innovation as the difference between a measured value of the measurement equation and an estimated value of the measurement equation—the measurement equation describes the absolute value of the acceleration as corresponding to 1 g;

c3. testing the innovation for a normal distribution;

c4. recognizing the interfering acceleration in the event of a deviation from the normal distribution, in addition to the following method step:

d. repeating the adjustment if an interfering acceleration is recognized, as indicated by arrow 41;

e. accepting the estimated values for sensitivity and offset as calibration values if an interfering acceleration is not recognized. The method is repeated during operation, as indicated by arrow 42. In the next pass, the values for sensitivity and offset which have just been accepted in step e. are used in step b. as calibration values. The calibration is thus improved according to the present invention, and in the event of a temperature drift or an aging drift of the sensor the calibration is updated.

Regarding the subdivision of the procedure into method steps, it is pointed out that the individual steps are tuned to one another, and that different interactions may occur, depending on the embodiment. Substeps of method step c. in combination characterize the method according to the present invention, but with regard to the overall method may be used under one or several other method steps, so that their combination according to the present invention is still carried out in cooperation. Thus, depending on whether an interfering acceleration has occurred during or after the calibration, step c. may be carried out during or after step b.; i.e., substeps of method step c. may be concluded before method step b. is completed.

In the Cartesian coordinate system of acceleration sensor 21 from FIG. 1, acceleration a of the rest states in all positions of the sensor in space is situated on a spherical surface having a radius of 1 g. If a switch is made to output voltage U supplied by the sensor, the sphere is elliptically deformed according to the different sensitivities of the measuring directions as described in sensitivity matrix S. The zero errors result in an offset O, which may be represented as a displacement of the ellipsoid from the origin of the coordinate system. In the system which is assumed to be linear, the expression $U=S*a+O$ applies for the output voltage, resulting in $a=S^{-1}(U-O)$ for the acceleration acting on a test mass. For simplification, S is assumed to be a diagonal matrix. For a rest state, also referred to as a quasi-static state, the following expression is valid: $|a|=1$ g, i.e. $|S^{-1}(U-O)|=1$ g, or $|S^{-1}(U-O)|^2=1$ $g^2$.

Such a rest state without interfering acceleration is recognized in method step a. and checked in method step c.

In the present example, the assumed rest state is checked in method step c. by implementation as a filter with the aid of a so-called pseudomeasurement. For this purpose, the mean of the acceleration is estimated, and the "measured value" is assumed to be 1 g. The statement that a measured value of 1 g is assured as the acceleration refers to the measurement equation, and thus, that a "measured value" in the measurement equation does not have to have been actually ascertained by a measurement. This is not a measurement in the literal sense, since the value "1 g" is not detected by a sensor. An innovation, i.e., a difference between a measured "measured value" and an estimated "measured value," is then monitored. In this example, a residuum (y−y') is selected as an innovation, y being the actual measured value and y' being the estimated measured value. Depending on the measurement equation selected, y and y' may be scalars or vectors. In this case the residuum is normalized to its standard deviation, which then must correspond to a random variable having a normal distribution. A test for normal distribution, specified by the mean value and the variance, may then be applied to the random variable. If the residuum is too large, an interfering acceleration is assumed, and the measurement must be discarded with regard to a calibration.

In this case modeling is carried out using a parameter model which is based on perturbations in the form of noise terms for sensitivity and offset. Supplementation with a kinematic model also takes a noise term into account for the acceleration, but this is not addressed here. In the parameter model, a state change between two successive measurements is described for sensitivity and offset, using k as a running index: $S_{k+1}=S_k+v_{S,k}$ and $O_{k+1}=O_k+v_{O,k}$, with noise terms $v_{S,k}$ for sensitivity and $v_{O,k}$ for offset. The noise terms may be used to describe a variation over time, for example due to temperature or aging, using a random walk model. According to the present invention, residuum e of the pseudomeasurement is then $e_{g,k}=1$ g$-|S_k^{-1}(u_k+V_k-O_k)|$, or, in metric units, $e_{g,k}=9.81-|S_k^{-1}(u_k+v_k-O_k)|$, where v stands for measurement noise of the sensor.

Figure 4:
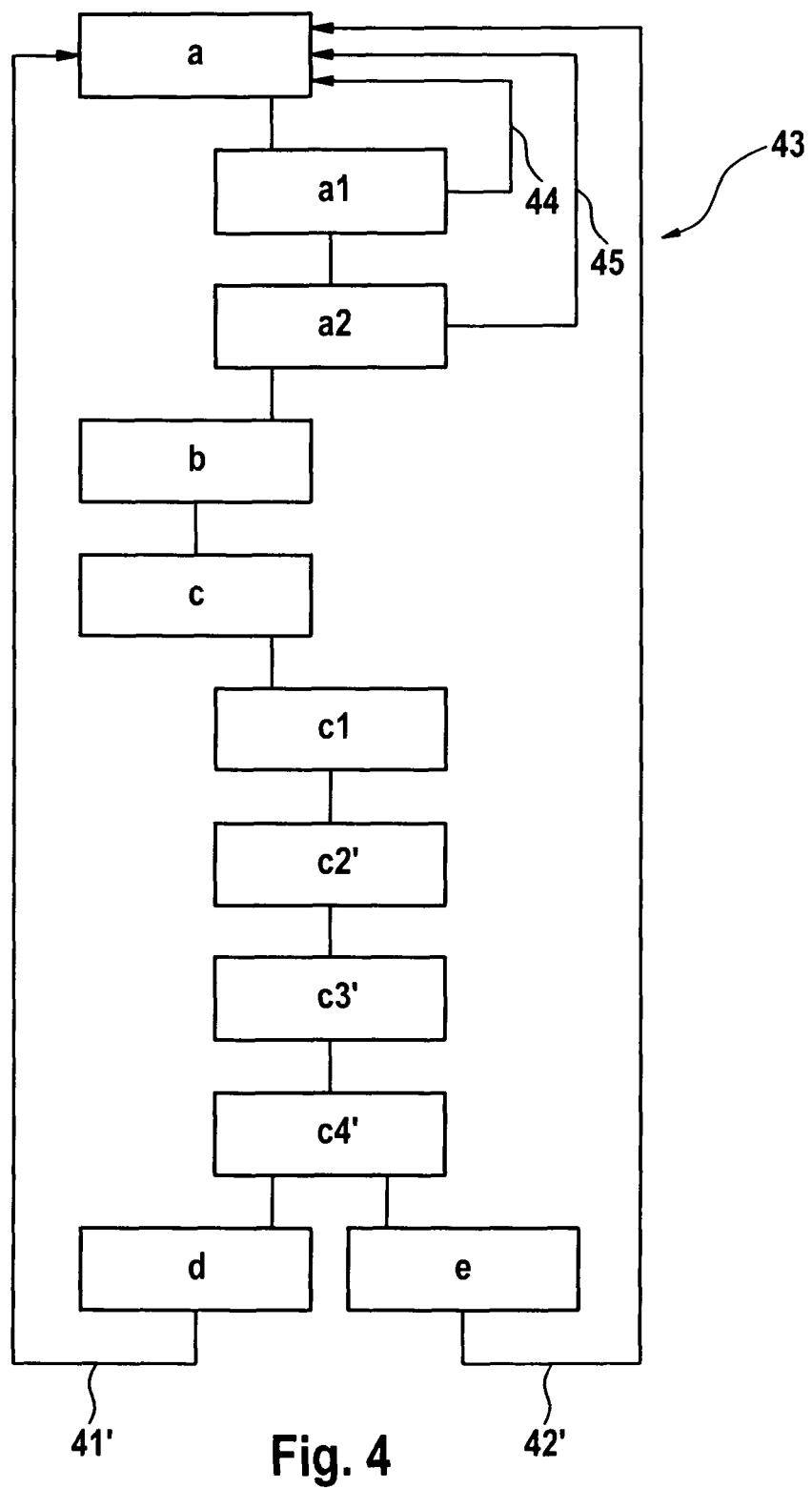
FIG. 4 shows a flow chart of the method according to the present invention in a second example embodiment.

In flow chart 43, FIG. 4 shows a method for self-adjustment of a triaxial acceleration sensor during operation in a different specific embodiment from FIG. 1, in which identical method steps have the same reference characters, and modified method steps have apostrophes following the reference characters. The method steps are as follows:

a. ensuring the observability of the sensitivity and the offset of the sensor, having the following substeps:

a1. recognizing a rest situation—if a rest situation is not present, no calibration may be carried out and the method is repeated according to arrow 44;

a2. recognizing whether new information is present—if new information is not present, no calibration may be carried out, and the method is repeated according to arrow 45;

b. calibrating the sensor with the aid of calibration values for sensitivity and offset;

c. checking the self-adjustment for an interfering acceleration with the aid of a measurement equation and estimated values for sensitivity and offset, having the following substeps:

c1. estimating sensitivity and/or offset and the variance thereof;

c2'. determining an innovation as the difference between a measured value of the measurement equation and an estimated value of the measurement equation—here as well, the absolute value of an acceleration vector is estimated to be 1 g, and a measured value of 1 g is assumed as the acceleration. A normalized innovation is also used in this specific embodiment. The residuum (y−y') is normalized to its variance Var(y−y'). The innovation is then NIS=$(y-y')^T$ Var'(y−y') (y−y'), with the transposed residuum being $(y-y')^T$. This is followed by method step c3'. testing the innovation for a chi square distribution—this is coordinated with the use of a normalized innovation in method step c2;

c4'. recognizing the interfering acceleration in the event of a deviation from the chi square distribution; this is followed by method step d. repeating the adjustment if an interfering acceleration is recognized, as indicated by arrow 41';

e. accepting the estimated values for sensitivity and offset as calibration values if an interfering acceleration is not recognized. The method is repeated during operation as indicated by arrow 42'.

What is claimed is:

1. A method for self-adjustment of a triaxial acceleration sensor during operation using a computing unit including an estimator, comprising:

identifying, using the computing unit, a rest state of the acceleration sensor based on an output voltage of the sensor, directional sensitivities of the acceleration sensor included in a sensitivity matrix, and an offset;

identifying whether acceleration values from the acceleration sensor are new values using the computing unit;

calibrating the sensor using the computing unit for sensitivity and offset with the aid of calibration values when the acceleration sensor is in the rest state using the identified new values;

checking for an interfering acceleration, with the aid of a measurement equation and estimated values for sensitivity and offset using the computing unit, wherein the checking includes:

estimating sensitivity, variance of sensitivity, offset and variance of offset;

determining a difference between a measured value of the measurement equation and an estimated value of the measurement equation;

testing the determined difference for a normal distribution; and recognizing that an interfering acceleration exists in the event of a deviation from the normal distribution;

repeating the calibrating using the computing unit if an interfering acceleration is recognized; and accepting the estimated values for sensitivity and offset as calibration values if an interfering acceleration is not recognized.

2. The method as recited in claim 1, further comprising: calculating and outputting an acceleration value.

3. The method as recited in claim 2, wherein the sensitivity, variance of sensitivity, offset and variance of offset are estimated using the estimator.

4. The method as recited in claim 3, wherein the estimator includes a Kalman filter for estimating the sensitivity, variance of sensitivity, offset and variance of offset.

5. The method as recited in claim 3, wherein the measurement equation describes the absolute value of the acceleration as corresponding to 1 g.

6. The method as recited in claim 5, wherein in determining the difference between a measured value of the measurement equation and an estimated value of the measurement equation, the absolute value of an acceleration vector is estimated to be equal to 1 g, and a measured value of 1 g is assumed as the acceleration.

7. The method as recited in claim 5, wherein in determining the difference between a measured value of the measurement equation and an estimated value of the measurement equation, a normalized difference is used, and wherein in testing the determined difference for a normal distribution, the normalized difference is tested for a chi square distribution.

8. The method as recited in claim 5, wherein before calibrating the sensor for sensitivity and offset, the method further includes ensuring the observability of the sensitivity and the offset of the sensor by recognizing a rest situation.

9. The method as recited in claim 8, wherein the ensuring the observability of the sensitivity and the offset of the sensor further includes recognizing whether new information is present.

10. A sensor system, comprising:
a three-dimensional acceleration sensor;
a memory;
an estimator; and
a computing unit configured to (i) identify a rest state of the acceleration sensor based on an output voltage of the sensor, directional sensitivities of the acceleration sensor included in a sensitivity matrix, and an offset, (ii) identify whether acceleration values from the acceleration sensor are new values, and (iii) perform a calibration of the acceleration sensor during operation of the sensor when the acceleration sensor is in the rest state using the identified new values, wherein the computing unit is configured to (a) perform the calibration with the aid of the estimator, and (b) test a distribution function.

11. The sensor system as recited in claim 10, wherein values of a zero error and a sensitivity of the acceleration sensor are stored in the memory.

12. The sensor system as recited in claim 11, wherein the values of the zero error and the sensitivity are stored in the memory during manufacture of the sensor system.

13. The sensor system as recited in claim 11, further comprising an ASIC.

14. The sensor system as recited in claim 11, wherein the sensor system is configured as a module.

15. The sensor system as recited in claim 11, wherein the computing unit is an external computing unit.

16. The sensor system as recited in claim 11, wherein the computing unit is configured to perform the calibration in real time during operation of the sensor.

17. The method as recited in claim 1, further comprising:
applying a z test to a plurality of acceleration values to identify whether a newly measured acceleration value originates from a same distribution function having a normal distribution as previously measured acceleration values; and
identifying the newly measured acceleration value as new when the newly measured acceleration value does not originate from the same distribution function.

18. The method as recited in claim 1, further comprising:
after recognizing that the interfering acceleration exists, modeling a state change between two successive measurements using a parameter model based on perturbations in a form of noise terms for the sensitivity and the offset; and
calibrating the sensor based on the modeling.

* * * * *